(12) United States Patent
Potter et al.

(10) Patent No.: US 10,222,022 B2
(45) Date of Patent: Mar. 5, 2019

(54) COVERED FIBER BUNDLE FOR LIGHTING MODULES

(71) Applicant: Valeo North America, Inc., Troy, MI (US)

(72) Inventors: Brant Potter, Seymour, IN (US); Kayla Greene, Seymour, IN (US); Nate Montgomery, Seymour, IN (US)

(73) Assignee: Valeo North America, Inc., Troy, MI (US)

( * ) Notice: Subject to any disclaimer, the term of this patent is extended or adjusted under 35 U.S.C. 154(b) by 0 days.

(21) Appl. No.: 15/643,010

(22) Filed: Jul. 6, 2017

(65) Prior Publication Data

US 2019/0011109 A1 Jan. 10, 2019

(51) Int. Cl.
| | |
|---|---|
| *F21V 9/00* | (2018.01) |
| *F21S 43/236* | (2018.01) |
| *G02B 6/44* | (2006.01) |
| *F21V 8/00* | (2006.01) |
| *B60R 16/023* | (2006.01) |
| *F21S 43/20* | (2018.01) |
| *F21S 43/30* | (2018.01) |
| *H04L 29/08* | (2006.01) |

(52) U.S. Cl.
CPC .......... *F21S 43/236* (2018.01); *B60R 16/023* (2013.01); *F21S 43/20* (2018.01); *F21S 43/30* (2018.01); *G02B 6/001* (2013.01); *G02B 6/443* (2013.01); *H04L 67/12* (2013.01)

(58) Field of Classification Search
None
See application file for complete search history.

(56) References Cited

U.S. PATENT DOCUMENTS

| | | | | |
|---|---|---|---|---|
| 5,058,985 A | * | 10/1991 | Davenport | G02B 6/403 362/558 |
| 5,278,731 A | | 1/1994 | Davenport et al. | |
| 5,438,485 A | | 8/1995 | Li et al. | |
| 5,558,421 A | * | 9/1996 | Guastella | F21S 10/005 362/277 |
| 5,931,559 A | * | 8/1999 | Pfaeffle | A42B 3/044 362/106 |
| 2002/0045811 A1 | * | 4/2002 | Kittrell | A61B 1/00096 600/407 |
| 2015/0062956 A1 | * | 3/2015 | Genier | G02B 6/0006 362/554 |

(Continued)

FOREIGN PATENT DOCUMENTS

| | | |
|---|---|---|
| DE | 10 2011 006 645 A1 | 10/2012 |
| KR | 1997-0010182 B1 | 6/1997 |
| KR | 1998-045596 U | 9/1998 |

(Continued)

*Primary Examiner* — Ashok Patel
(74) *Attorney, Agent, or Firm* — Oblon, McClelland, Maier & Neustadt, L.L.P.

(57) ABSTRACT

A fiber bundle includes a plurality of optical fibers, a light source, and a fiber cover. The light source is coupled to the plurality of optical fibers and operable to direct light into input ends of the plurality of optical fibers. The fiber cover has a predetermined cross-sectional shape configured to hold the plurality of optical fibers in a bundled position and to transmit light into an outer region of the plurality of optical fibers defining an illumination region for vehicle lighting functions.

18 Claims, 5 Drawing Sheets

(56) References Cited

U.S. PATENT DOCUMENTS

2018/0023776 A1* 1/2018 Greene .................. F21S 41/29
362/511

FOREIGN PATENT DOCUMENTS

| KR | 0169639 B | 10/1998 |
| KR | 10-2007-0031632 | 3/2007 |
| WO | 2014/170101 A1 | 10/2014 |

* cited by examiner

COVERED FIBER BUNDLE FOR LIGHTING MODULES

BACKGROUND

Motor vehicles contain numerous lighting devices for both interior and exterior illumination. For example, exterior vehicle lighting devices may perform stop light functions, taillight functions, headlamp functions, daytime running light functions, dynamic bending light functions, and fog light functions.

Vehicle manufacturers have made an effort to design vehicle lighting devices in consideration of the styling of a vehicle on which the lighting devices are mounted. Further, vehicle manufacturers may provide optional lighting effects (in addition to the required lighting functionality) to enhance vehicle styling.

The foregoing "Background" description is for the purpose of generally presenting the context of the disclosure. Work of the inventor, to the extent it is described in this background section, as well as aspects of the description which may not otherwise qualify as prior art at the time of filing, are neither expressly or impliedly admitted as prior art against the present invention.

SUMMARY

An aspect of the present disclosure includes a fiber bundle. The fiber bundle includes a plurality of optical fibers, a light source coupled to the plurality of optical fibers and operable to direct light into input ends of the plurality of optical fibers, and a fiber cover having a predetermined cross-sectional shape configured to hold the plurality of optical fibers in a bundled position and to transmit light into an outer region of the plurality of optical fibers defining an illumination region for vehicle lighting functions.

Another aspect of the present disclosure includes a lighting module for a vehicle. The lighting module includes a plurality of optical fibers, one or more light sources coupled to the plurality of optical fibers and operable to direct light into input ends of the plurality of optical fibers, a fiber cover having a predetermined cross-sectional shape configured to hold the plurality of optical fibers in a bundled position forming a fiber bundle and to transmit light into an outer region of the plurality of optical fibers defining an illumination region; and an optical component, wherein the fiber bundle is positioned at an optical center of the optical component.

In one embodiment, the fiber cover includes a plurality of holes having a predetermined pattern.

In one embodiment, the fiber bundle includes a cap disposed at output ends of the plurality of optical fibers.

In one embodiment, the cap is absorbing and prevents axial light emission by the plurality of optical fibers.

In one embodiment, the cap is reflective.

In one embodiment, the light source includes a solid state light emitter.

In one embodiment, the fiber bundle also includes a bundling element for bundling together the input ends of the plurality of optical fibers.

In one embodiment, the bundling element includes a ferrule configured to hold the optical fibers in a bundle having the predetermined cross-sectional shape.

In one embodiment, a part of the plurality of optical fibers is extended therefrom to form one or more fiber panels.

In one embodiment, the predetermined cross-sectional shape is circular, triangular, or hexagonal.

In one embodiment, the fiber cover includes phosphors or quantum dots.

Another aspect of the present disclosure includes a method for manufacturing a fiber bundle. The method includes providing a plurality of optical fibers, attaching a light source to input ends of the plurality of optical fibers, and applying a fiber cover to the plurality of optical fibers, the fiber cover having a predetermined cross-sectional shape configured to hold the plurality of optical fibers in a bundled position and to transmit light into an outer region of the plurality of optical fibers defining an illumination region for vehicle lighting functions.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 1A:
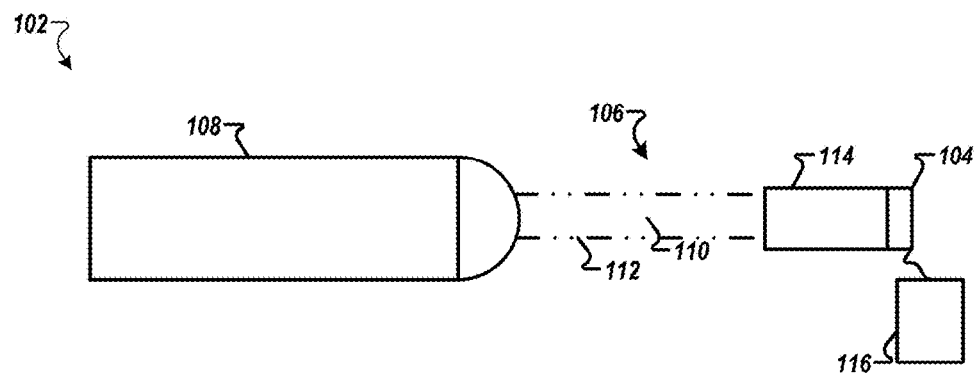
FIG. 1A is a planar view of a fiber optical panel and a covered fiber bundle according to one example.

Referring now to the drawings, wherein like reference numerals designate identical or corresponding parts throughout several views, the following description relates to a fiber bundle, a lighting module including the fiber bundle, and methodology for fabricating the fiber bundle.

Optical fibers are used to transmit light from one end of a fiber to the other end. This mode of operation based on total internal reflection (TIR) is used for lighting. Optical fibers may also be treated to emit light from the surface of the fibers. The alteration of optical fibers for the purpose of surface emission may involve grinding or abrading the surface of the fibers to produce regular or random surface features that allow some of the transmitted light to escape from the core of the optical fibers.

Fiber panel modules generally include a controller, a coupler, an optical fiber bundle, and an emitting panel. The emitting panel may include optical fibers from the optical fiber bundle that have been fixated on to a backing, and then processed to extract light. The fiber panel modules generally include a light source that inputs light to the optical fiber bundle having fibers extending therefrom to form the emitting panel. In current designs, significant light decoupling occurs in a fiber bundle region 100 shown in FIG. 1B (i.e., region in between the controller and the panel). FIG. 1C shows the optical fiber bundle without a cover.

Currently, the decoupled light is not utilized and contributes to reduced efficiency in fiber panel modules. In addition, the fiber bundle region 100 is not aesthetically pleasing and has to be hidden. However, the present inventors have recognized that light emerging from fibers may be used for versatile lighting functionality that otherwise may be wasted. It is desirable, as recognized by the inventors, to be able to utilize the light leaked from the fiber bundle region 100 to contribute to lighting functions (e.g., tail, rear sidemarker), and also be used as a styling element.

Figure 1B:
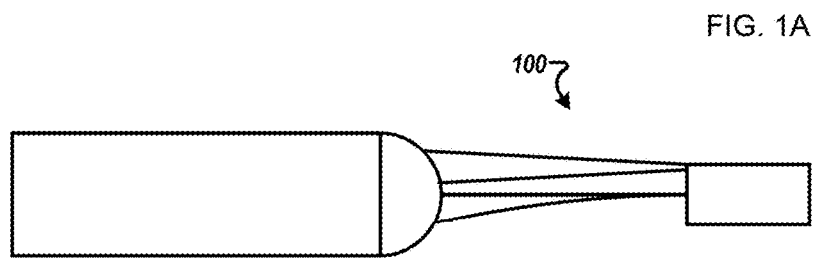
FIG. 1B is a planar view of the fiber optical panel according to one example.
Figure 1C:
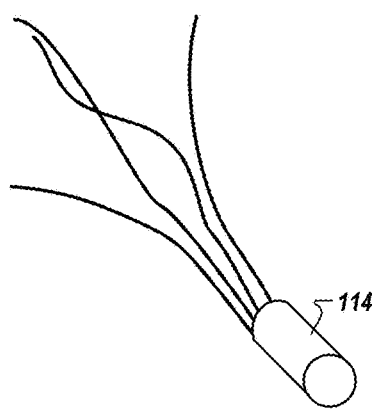
FIG. 1C is a schematic view of a fiber bundle according to one example.
Figure 1D:
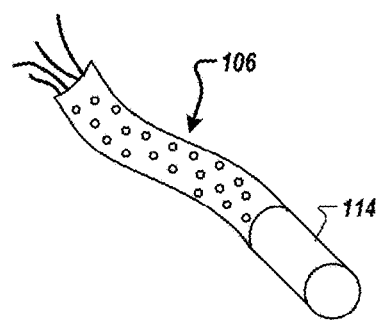
FIG. 1D is a schematic view of the covered fiber bundle according to one example.

FIG. 1A is a schematic view of a fiber optic light panel device 102 according to one example. The fiber optic light panel device 102 includes a light source 104, a fiber bundle 106, and a fiber panel 108. The fiber bundle 106 includes optical fibers 110 and a bundle cover 112. The fiber panel 108 may include a backing and a cover layer. The bundle cover 112 may be a wrap or a sleeve to hold the optical fibers 110 in a bundled position as illustrated in FIG. 1A. The light source 104 may be controlled via an operator interface (not shown). The bundle cover 112 has the advantage of providing easier routing of the fiber bundle 106 in a lamp assembly. FIG. 1D shows the fiber bundle with the bundle cover 112.

The fiber bundle 106 may include a large number of glass or plastic optical fibers 110 that can be bound together at one end by bundling element 114. For example, the fiber bundle 106 may include a large number of abraded PMMA (Polymethyl methacrylate) fibers. The bundling element 114 may be formed from a brass or plastic ferrule, cable tie, tape, adhesive, or other material that can hold the fiber bundle 106 in a predetermined shape. Additional bundling elements may be used. The light generated by the light source 104 may be coupled to the fiber bundle 106 for transmission to the fiber panel 108. In the drawings, only a small number of optical fibers 110 is shown for simplicity. In one example, the fiber bundle 106 may be coupled to the light source 104 via an optical fiber coupler (not shown). Further, the light source 104 may include a heat sink (not shown).

The fiber bundle 106 described herein may include from several tens of fibers to thousands of fibers. All or a part of the optical fibers 110 may be extended therefrom to form one or more fiber panels 108. In one implementation, the fiber bundle 106 may include approximately between 250 and 350 fibers of 0.23 mm diameter.

The use of the bundle cover 112 in fiber bundle 106 allows the fiber bundle 106 to be used for lighting functionality and as a styling element. The bundle cover 112 can be used to precisely constrain the fiber bundle's cross sectional shape, allow for easier fixation, allow for the fiber bundle part to be used for photometric functions, and create a styling element in a vehicle lamp as described further below. In addition, the bundle cover 112 protects the optical fibers 110 (e.g., flame retardant, moisture, dust). The color, transmissivity, mesh profile shape, and other characteristics of the bundle cover 112 can be used to modify the light function and style as described later herein.

Optical fibers 110 can be arranged in a generally parallel relationship with respect to one another within the bundle cover 112. However, it should be understood that optical fibers 110 may assume similar or different positions (e.g., parallel, non-parallel, curved, accurate or serpentine). Optical fibers 110 may have different sizes or dimensions, such as different parameters.

Light source 104 may include one or more light emitting devices or solid state light sources. The term "solid state" generally refers to light emitted by solid-state electroluminescence, as distinct from light emitted by a source of incandescence or fluorescence. For example, light source 104 may include an inorganic semiconductor light emitting diode (LED) or laser diode, an organic light emitting diode (OLED), polymer light emitting diode (PLED), an LED lamp package, LED chip or LED die, or an array of one or more of these devices. When a plurality of devices of LEDs is used, the LEDs may have the same or different colors. The light source 104 may be an LED may be multiple discrete LEDs or an LED light bar. In one example, the light source 104 may be an LED providing approximately 2W, 140 lm output at 2.65 Volts and 750 mA of current. The light source 104 may be controlled using a controller 116.

The bundle cover 112 can be made flexible, of different colors, and/or a different meshing type. The bundle cover 112 can be made opaque or translucent (transparent). In addition, a first section of the bundle cover 112 may be transparent and a second section of the bundle cover 112 may be opaque. In one example, the bundle cover 112 may include alternating opaque and transparent sections. Further, a bottom or top section of the bundle cover 112 may be opaque. For example, for a bundle cover 112 having a rectangular cross section, one or more sides may have different properties such as opacity, color, and the like. The bundle cover 112 can be made of plastic and/or metal. In one implementation, the bundle cover 112 may be a braided sleeve made from polyester PET (Polyethylene Terephthalate) monofilament. The cross-sectional shape of the covering can be circular, elliptical, rectangular, or various polygonal shapes. The cross-section of the cover may have a size as a function of the size and number of the optical fibers 110.

Figure 2A:
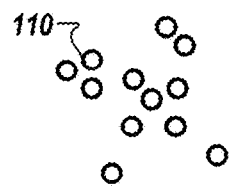
FIGS. 2A-2D are schematic views of cross sections of exemplary fiber bundles.
Figure 2B:
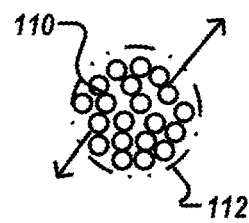
Figure 2C:
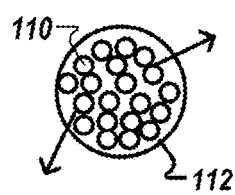
Figure 2D:
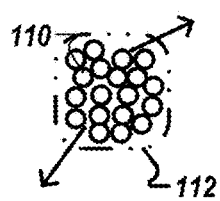

FIGS. 2A-2D are schematic views of cross sections of exemplary fiber bundles. FIG. 2B shows the bundle cover 112 having a circular cross section. The bundle cover 112 includes a plurality of holes (i.e., openings) that allow light from the optical fibers 110 out. The density and size of the plurality of holes may vary as a function of vehicle lighting functions, for example, to control a light output from the fiber bundle 106. In one implementation, the bundle cover 112 may have a predetermined hole pattern based on the application to control the light emission and lit aspect. In one example, the predetermined hole pattern may be asymmetrical. In other words, a first hemisphere of the bundle cover 112 may include one or more holes, and a second hemisphere may not include holes. FIG. 2C shows a cross section view of a fiber bundle 206 having a circular shape. The fiber cover 112 may be translucent. The fiber may be of different colors (e.g., clear, red, orange, yellow, green, blue, gray, white). FIG. 2D shows bundle cover 112 having a rectangular shape. For example, a circular shape may be used for applications that require bending and uniform emission. In one example, a rectangular shape may provide a greater rigidity along certain directions. The cross-sectional shape may also be triangular, hexagonal, or the like.

The bundle cover 112 may also be enhanced with pigments, nanoparticles, phosphors, quantum dots or other additive to change optical properties across the fiber bundle 106. In one example, phosphors can be included in any portion of the bundle cover 112 to affect wavelength (i.e., color) output of the bundle cover 112. Additionally or alternatively diffusing materials can be included to affect light scattering of the light output from the bundle cover 112. A phosphor, most generally, is a substance that exhibits the phenomenon of luminescence. To emit white light or amber light, the phosphor can include, for example, at least one of the following compounds: $Y_3Al_5O_{12}$: $Ce^{3+}$ (YAG), $(Sr, Ba)2SiO_4$: $Eu^{2+}$, $Ca_x (Si, Al)_{12} (O, N)_{16}:Eu^{2+}$. These compounds convert blue light into yellow light. By adjusting the composition of the phosphor, the additive synthesis of these two colors will be a white light or an amber light.

The optical cover 112 may include additional layers to facilitate different light output associated with different vehicle lighting functions. Light types output can include color, hue, tint, tone, and/or shade of the light output, as well as intensity, brightness or any other desired characteristic in any light output region of the optical cover 112.

Spatial variation of light in the fiber bundle 106 may be achieved by use of multiple light sources for the optical fiber 110. For example, two light sources having different characteristics may be coupled to the optical fibers 110.

The fiber bundle 106 can be used directly as a lighting function, or as a contributor to a lighting function in conjunction with other lighting function elements (i.e., supplemental). The fiber bundle 106 can be used as a light contributor for tail, stop, turn, position, daytime running light (DRL), and sidemarker functions. The fiber bundle 106 can be used as a controlled light source for secondary optics. The fiber bundle 106 can be used as a styling element. The fiber bundle 106 can be made visible in the vehicle lamp easily.

Figure 3B:
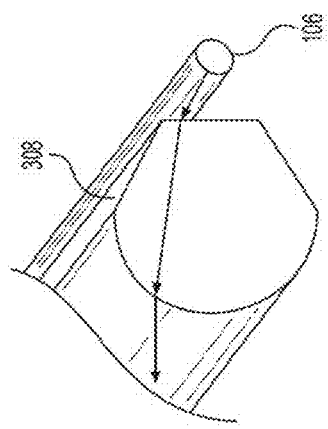
FIGS. 3A-3D are schematic views of a fiber bundle used in exemplary lighting devices.
Figure 3D:
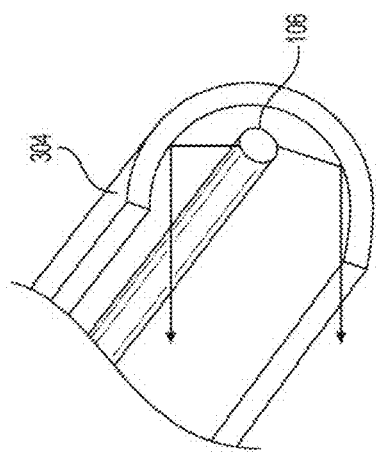
Figure 3A:
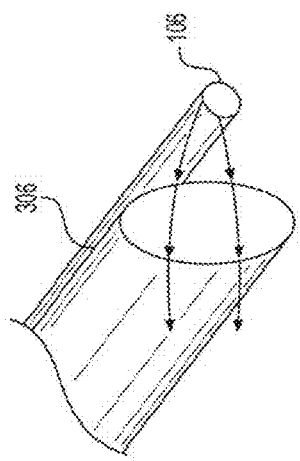
Figure 3C:
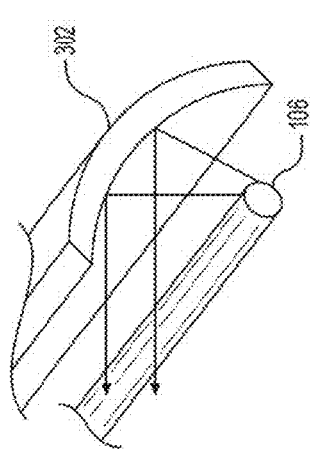

FIGS. 3A-3D are schematic views of the fiber bundle 106 used in exemplary lighting devices. In one example, the fiber bundle 106 can be used as a light source for an extruded reflector secondary element as shown in FIGS. 3A and 3C.

FIG. 3C shows the fiber bundle 106 positioned at the focus of an extruded through reflector 304. The cross-section of the reflector 304 section can be extruded along the center-axis of a profile of the fiber bundle 106. FIG. 3A shows the fiber bundle 106 positioned at the focus of an extruded indirect reflector 302.

The fiber bundle 106 can be used directly as a rear sidemarker function as shown in FIGS. 3B and 3D. The fiber bundle 106 can be used as an extended light source placed at the focus of an imaging lens, for example, lens 306, 308 (e.g., an extruded tonic or another optical-oriented shape).

Since the fiber bundle 106 and the bundle cover 112 are flexible, the fiber bundle 106 can be used with dynamic and mechanical movement automotive lighting features (e.g., in a rotatable vehicle headlights). The bundle cover 112 may be bended. The bend radius may be a function of a minimum bend radius associated with optical fibers 110. The minimum bend radius of a particular optical fiber depends on the construction of the fiber, and may be in the range of 10 to 50 times the diameter of the fiber. For example, if the optical fiber has a diameter of 0.2 mm and the minimum bend radius is 20 times the diameter of the fiber, then the minimum bend radius of the fiber is 4 mm.

Figure 4A:
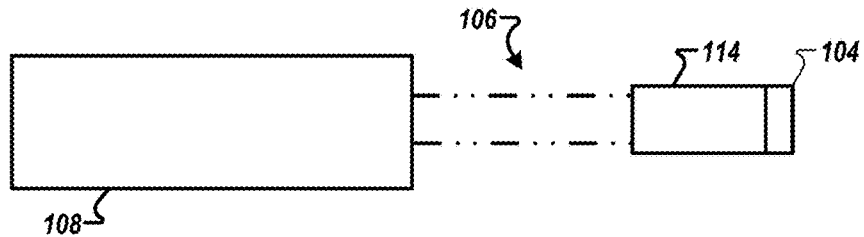
FIGS. 4A-4E show alternative embodiments of the fiber bundle.
Figure 4B:
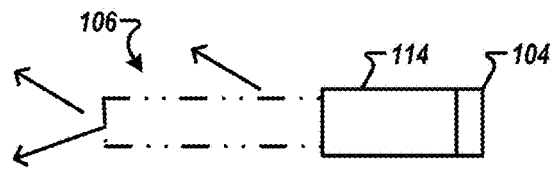
Figure 4C:
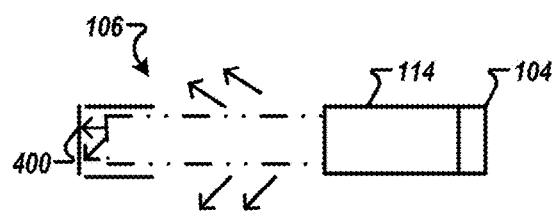
Figure 4D:
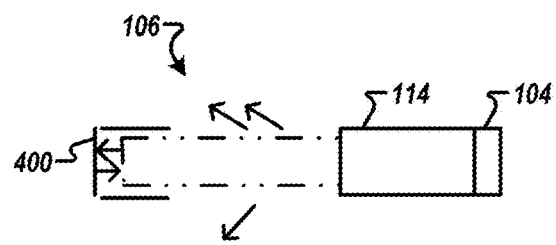
Figure 4E:
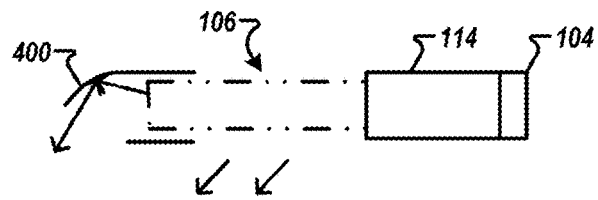

Further, the fiber bundle 106 can be used without the fiber panel 108 to create similar functionality. In some implementations, the fiber bundle 106 can be fitted with an end cap 400. The end cap 400 can be configured to: 1) block light leaving the fiber bundle (as shown in FIG. 4C), 2) reflect light back into the fiber bundle, which would increase the optical output (as shown in FIG. 4D), and 3) control light with an optic (reflective or refractive) as shown in FIG. 4E.

The cap 400 provides an additional optical component to enhance or alter characteristics of light output from the fiber bundle 106. For example, the cap 400 may be opaque to prevent the emission of light or the cap 400 may be translucent to allow emission of light from the end of one or more fiber bundles 106. The cap 400 may have a light emitting surface on a side positioned in a direction that is substantially different from that of a light emitting surface of the bundle cover 112. As with the bundle cover 112, the cap 400 may be modified to achieve or enhance different light outputs from the fiber bundle 106. For example, the cap 400 may also be enhanced with pigments, nanoparticles, phosphors, or other additive to change optical properties across the output from the cap 400. In one example, phosphors can be included in any portion of the cap 400 to affect wavelength (i.e., color) output of the cap 400.

Additional abrasions to the fiber bundle 106 and optical fibers 110 can allow higher output and better performance. Altering the optical fibers 110 to direct light in a desired direction can be achieved through a variety of methods including, but not limited to, providing the plurality of reflective surfaces as described previously herein, laser ablating a surface of a fiber, mechanical abrasion of a surface of each fiber 110, and the like. Further, depth, density and type of the alterations may be varied along the length of each fiber. For example, spacing between reflective surfaces may be varied in different portions of the fiber to achieve more or less light intensity at the surface of the fiber and/or to permit more or less light to be emitted from an end of the optical fibers 110 and therefore from the fiber bundle 106.

Figure 5:
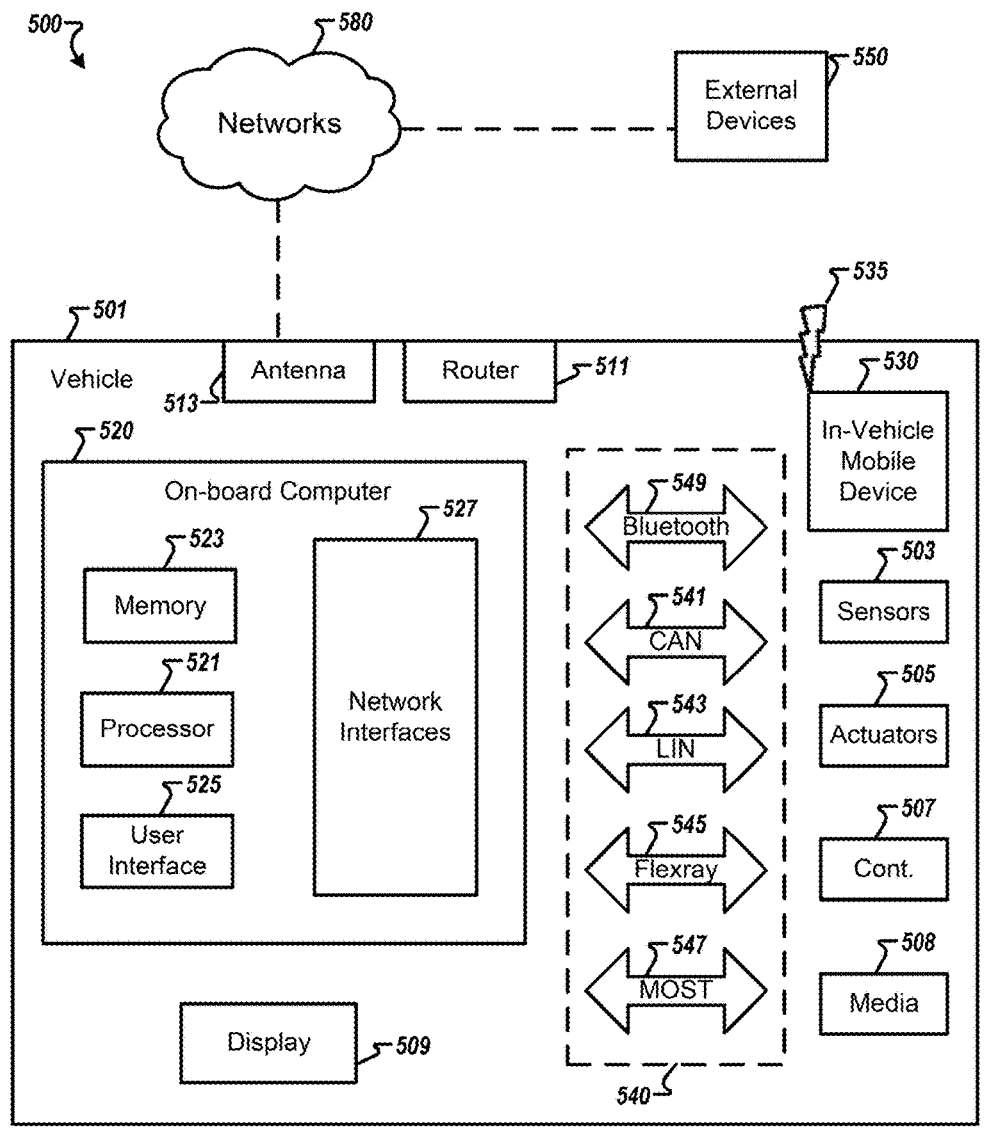
FIG. 5 is a block diagram of a vehicle environment in which embodiments of the invention disclosed herein may be implemented.

FIG. 5 is a simplified block diagram of a vehicle environment 500 in which embodiments of the invention disclosed herein may be implemented. The vehicle environment 500 includes a vehicle 501 in communication with one or more external devices 550 by way of one or more external networks 580. Vehicle 501 also includes various internal networks 540 for interconnecting several vehicle devices within the vehicle as will be discussed below. The vehicle environment 500 may also include one or more in-vehicle mobile device 530. External devices 550 include any device located outside the vehicle 501 such that the external device must communicate with the vehicle and its devices by an external network 580. For example, the external devices may include mobile devices, electronic devices in networked systems (e.g., servers or clients in a local area network (LAN), etc.), on board computers of other vehicles etc. In-vehicle mobile devices 530 are devices which are located within, or in the vicinity of the vehicle 501 such that the in-vehicle mobile device can communicate directly with internal networks 540 of the vehicle 501. In-vehicle mobile devices 530 may also connect with external networks 580 as discussed below.

Vehicle 501 includes vehicle devices integral with or otherwise associated with the vehicle 501. In the embodiment of FIG. 5, vehicle devices include one or more sensors 503, one or more actuators 505, one or more control units 507, one or more media systems 508, one or more displays 509, one or more routers 511, one or more antenna 513, and one or more on board computers 520. The one or more on board computers 520 may correspond to the controller 116. The one or more on board computers may generate signals having a desired duty factor to control one or more vehicle lights such as the light source 104. As used herein, the term "vehicle device" is meant to encompass sensors, actuators, controllers, electronic control units (ECUs), detectors, instruments, embedded devices, media devices including speakers, a CD and/or DVD player, a radio, etc, vehicle navigation systems (e.g., GPS) displays, other peripheral or auxiliary devices or components associated with the vehicle 501.

Sensors 503 detect various conditions within (or in the immediate vicinity of) the vehicle 501. For example, sensors 503 may be temperature sensors, photosensors, position sensors, speed sensors, angle sensors or any other sensor for detecting a diagnostic condition or other parameter of the vehicle 501 or its ambient environment. Sensors 503 may be passive or "dumb" sensors that provide an analog representative of the sensed parameter, or so called "smart" sensors with integrated memory and digital processing capability to analyze the parameter sensed within the sensor itself. Actuators 505 cause motion of some mechanical element of the vehicle in response to a control signal. For example, actuators 505 may be hydraulic actuators, pneumatic actuators or electrical/electronic actuators such as a stepper motor. Actuators 505 may be used to move vehicle lighting devices to implement intelligent light, for example. Actuators 505 may be used to move the fiber bundle 106.

Actuators 505 may also be "dumb" devices that react to a simple analog voltage input, or "smart" devices with built-in memory and processing capability. Actuators 505 may be activated based on a sensed parameter from sensors 503, and one such sensed parameter may be a physical position of the actuator 503 itself. Thus, the sensors 503 and actuators 505 may be connected in a feedback control loop for diagnostic detection and control of the vehicle 501.

Control units 507 include any embedded system, processor, electronic control unit (ECU) or microcontroller. Control unit 507 may be dedicated to a specific region or function of the vehicle 501. For example, control unit 507 can provide memory and control logic functions for several dumb devices, such as passive sensors 503 and actuators 505. In one embodiment, control unit 507 is an ECU dedicated for controlling one or more lighting devices, for example light source 104, according to embodiments disclosed herein. Typically, numerous ECUs, with different embedded software, may be found in a single automobile and may communicate via internal networks as discussed below.

On-board computer 520 is a vehicle device for providing general purpose computing functionality within the vehicle 501. The on-board computer 520 typically handles computationally intensive functions based on software applications or "apps" loaded into memory. On-board computer 520 may also provide a common interface for different communication networks in the vehicle environment 500. On-board computer 520 includes one or more processor 521, one or more memory 523, one or more user interface 525 (e.g., the operator interface described previously herein), and one or more network interface 527. One or more display 509 and one or more router 511 may be an integral part of the on board computer 510, or distributed in the vehicle and associated with the on-board computer and other vehicle devices. Separate displays 509 may be provided in suitable locations for access by a driver and passengers in the vehicle 501.

On-board computer 520, and other associated or integrated components such as vehicle devices can include one or more memory element 523 for storing information to be used in achieving operations associated with control of one or more vehicle lights as disclosed herein. Further, these devices may keep information in any suitable memory element (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in vehicle environment 500 could be provided in any database, register, table, cache, queue, control list, or storage structure, based on particular needs and implementations, all of which could be referenced in any suitable timeframe.

In example embodiments, the operations for controlling the fiber bundle 106 may be implemented by logic encoded in one or more tangible media, which may be inclusive of non-transitory media (e.g., embedded logic provided in an ASIC, digital signal processor (DSP) instructions, software potentially inclusive of object code and source code to be executed by a processor or other similar vehicle device, etc.). In some of these instances, one or more memory elements (e.g., memory 523) can store data used for the operations described herein. This includes the memory elements being able to store software, logic, code, or processor instructions that are executed to carry out the activities described in this Specification.

Processor 521 can execute software or algorithms to perform activities to enable control of lighting devices disclosed herein. A processor 521 can execute any type of instructions associated with the data to achieve the operations detailed herein. In one example, the activities outlined herein may be implemented with fixed logic or programmable logic (e.g., software/computer instructions executed by a processor) and the elements identified herein could be some type of a programmable processor, programmable digital logic (e.g., an FPGA, an EPROM, an EEPROM), or an ASIC that includes digital logic, software, code, electronic instructions, flash memory, optical disks, CD-ROMs, DVD ROMs, magnetic or optical cards, other types of computer-readable mediums suitable for storing electronic instructions. Any of the potential processing elements, modules, microprocessors, digital signal processors (DSPs), and other devices described herein should be construed as being encompassed within the broad term 'processor.'

Elements of FIG. 5 may be communicatively coupled to one another by one or more suitable communications medium (e.g., wired, wireless, optical) that provides a pathway for electronic communications. Any element in FIG. 5 may act as a network node in communication with any other element of FIG. 5 also acting as a network node. Any suitable network messaging protocol, network topology or network geographic scope may be included in the vehicle environment 500. Thus, embodiments of on-board computer 520 may include one or more distinct interfaces, represented by network interfaces 527, to facilitate communication via the various networks (including both internal and external networks) described herein. Such network interfaces 527 may be inclusive of multiple wireless interfaces (e.g., WiFi, WiMax, 3G, 4G, white space, 802.11x, satellite, Bluetooth, LTE, GSM/HSPA, CDMA/EVDO, DSRC, CAN, GPS, etc.). Other interfaces represented by network interfaces 527, may include physical ports (e.g., Ethernet, USB, HDMI, etc.), interfaces for wired and wireless internal subsystems, and the like. Similarly, each of the nodes of vehicle environment 500 can also include suitable interfaces for receiving, transmitting, and/or otherwise communicating data or information in the vehicle environment 500.

Multiple internal vehicle networks represented by 540 may exist in the vehicle 501 to provide communication pathways to various vehicle devices distributed throughout the vehicle 501. An internal vehicle network 540 is a collection of nodes, such as vehicle devices, integrated with or otherwise linked to the vehicle and interconnected by communication means. Vehicle networks 540 typically include hard wired bus type networks, each providing communication pathways to particular vehicle devices distributed throughout a vehicle. FIG. 5 shows four examples of such hard wired networks: Controller Area Network (CAN) 541, Local Internet Network (LIN) 543, Flexray bus 545, and Media Oriented System Transport (MOST) network 547.

CAN bus 541 uses a message based protocol, designed for and typically used by automotive applications. The CAN bus 541 is a vehicle bus standard designed to allow microcontrollers, sensors, and other devices to communicate with each other via the CAN without a host computer. CAN protocol may be used for soft real-time control of devices such as a vehicle antilock braking system. For example, CAN bus 541 may connect a transmission sensor and an energy sensor to a main engine controller, and a different CAN bus may connect the main engine controller and a main body controller to on-board computer 520. LIN network 543 may be used to sense external conditions such as light, or to control small mechanisms such as door locking systems. For example, UN bus 543 may connect a driver's seat actuator, temperature controls, and windshield wiper actuators to a main body controller of a CAN bus.

Flexray bus 545 is typically a dedicated network for hard real-time controllers, used for drive-by-wire and/or brake-by-wire applications in which information from the engine and/or wheels of the vehicle 501 is collected and transmitted to appropriate applications and/or data repositories. For example, Flexray bus 545 may connect a chassis module of the vehicle 501 to on-board computer 520 through an appropriate interface, and/or may connect brakes and electronic stability control (ESB) to the chassis module attached to Flexray 545. MOST network 547 can also be found in vehicles for transmitting audio, video, and voice on fiber optics. MOST buses 547 can connect media system 508, to on-board computer 520 through appropriate interfaces, and/or connect a reversing camera and a navigation system to an intermediate device which is connected to computer by MOST bus 547.

Other hard wired internal networks such as Ethernet may be used to interconnect vehicle devices in the vehicle 501. Further, internal wireless networks 549, such as near field communications, Bluetooth, etc. may interconnect vehicle devices.

External networks 580 may be accessed from vehicle 501 by vehicle devices and in-vehicle mobile devices 530 when a communication link 535 is available. In-vehicle mobile devices 530 include mobile phones, smart mobile phones (smartphones), e-book readers, tablets, iPads, personal digital assistants (PDAs), laptops or electronic notebooks, portable navigation systems, multimedia gadgets (e.g., cameras, video and/or audio players, etc.), gaming systems, other handheld electronic devices, and any other device, component, element, or object capable of initiating voice, audio, video, media, or data exchanges within vehicle environment 500. Data may be any type of numeric, voice, video, or script data, or any type of source or object code, or any other suitable information in any appropriate format that may be communicated from one point to another in electronic devices and/or networks. A vehicle router 511 may also be used to access external network infrastructure within range of the antenna 513 of vehicle 501.

Some form of wireless communication is needed to achieve external network connectivity from vehicle 501. For example third generation (3G), fourth generation (4G), and 3GPP long term evolution (LTE) wireless telephone technologies, worldwide interoperability for microwave access (WiMax), WiFi, and dedicated short-range communications (DSRC) are some of the numerous wireless technologies currently available with the appropriate interfaces and network infrastructure to support the technology.

Users (driver or passenger) may initiate communication in vehicle environment 500 via some network, and such communication may be initiated through any suitable device such as, in-vehicle mobile device 530, display 509, user interface 525, or external devices 550, for example to activate a mode of operation of the light source 104.

In-vehicle mobile devices 530, and mobile devices external to vehicle 501, may communicate with on-board computer 520 through any wireless or wired communication link and may be configured as a personal area network (PAN) or a wireless personal area network (WPAN) or any other appropriate networking architecture or system that facilitates communications in a network environment. Wired and wireless communication links may any electronic link such as Bluetooth, wireless technologies (e.g., IEEE 802.11x), a USB cable, an HDMI cable, etc. In one example, an external mobile device may be connected to computer 520 through a USB cable or wireless network when, for example, the external mobile device is a diagnostic tool used by a mechanic for servicing vehicle 501.

Obviously, numerous modifications and variations are possible in light of the above teachings. It is therefore to be understood that within the scope of the appended claims, the invention may be practiced otherwise than as specifically described herein.

A system which includes the features in the foregoing description provides numerous advantages. In particular, decoupled light in fiber panel modules is utilized which increases the efficiency in fiber panel modules. In addition, the fiber bundle is aesthetically pleasing and provides versatile lighting functionality that otherwise may be wasted.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A fiber bundle comprising:
   a plurality of optical fibers;
   a light source coupled to the plurality of optical fibers and operable to direct light into input ends of the plurality of optical fibers; and
   a fiber cover having a predetermined cross-sectional shape, the fiber cover holding the plurality of optical fibers in a bundled position and transmitting light into an outer region of the plurality of optical fibers defining an illumination region for vehicle lighting functions, wherein
   the fiber cover includes a plurality of holes having a predetermined pattern at a peripheral surface thereof.

2. The fiber bundle of claim 1, wherein
   the fiber cover includes phosphors or quantum dots.

3. The fiber bundle of claim 1, further comprising:
   a cap disposed at output ends of the plurality of optical fibers.

4. The fiber bundle of claim 3, wherein
   the cap is absorbing and prevents axial light emission by the plurality of optical fibers.

5. The fiber bundle of claim 3, wherein
the cap is reflective.

6. The fiber bundle of claim 1, wherein
the light source includes a solid state light emitter.

7. The fiber bundle of claim 1, further comprising:
a bundling element for bundling together the input ends of the plurality of optical fibers.

8. The fiber bundle of claim 7, wherein
the bundling element includes a ferrule configured to hold the optical fibers in a bundle having the predetermined cross-sectional shape.

9. The fiber bundle of claim 1, wherein
a part of the plurality of optical fibers are extended therefrom to form one or more fiber panels.

10. The fiber bundle of claim 1, wherein
the predetermined cross-sectional shape is circular, triangular, or hexagonal.

11. A lighting module for a vehicle, the lighting module comprising:
a plurality of optical fibers;
one or more light sources coupled to the plurality of optical fibers and operable to direct light into input ends of the plurality of optical fibers;
a fiber cover having a predetermined cross-sectional shape, the fiber cover holding the plurality of optical fibers in a bundled position forming a fiber bundle and transmitting light into an outer region of the plurality of optical fibers defining an illumination region, wherein the fiber cover includes a plurality of holes having a predetermined pattern at a peripheral surface thereof; and
an optical component, wherein the fiber bundle is positioned at an optical center of the optical component.

12. The lighting module of claim 11, wherein the fiber cover is transparent.

13. The lighting module of claim 11, wherein
the optical component is an imaging lens.

14. The lighting module of claim 11, wherein
the optical component is a reflector, the reflector being extruded along a center of the fiber bundle.

15. The lighting module of claim 11, further comprising:
a cap disposed at output ends of the plurality of optical fibers.

16. The lighting module of claim 11, wherein
a part of the plurality of optical fibers are extended therefrom to form one or more fiber panels providing a second illumination region.

17. A method of manufacturing a fiber bundle, the method comprising:
providing a plurality of optical fibers;
attaching a light source to input ends of the plurality of optical fibers; and
applying a fiber cover to the plurality of optical fibers, the fiber cover having a predetermined cross-sectional shape, the fiber cover holding the plurality of optical fibers in a bundled position and transmitting light into an outer region of the plurality of optical fibers defining an illumination region for vehicle lighting functions, wherein
the fiber cover includes a plurality of holes having a predetermined pattern at a peripheral surface thereof.

18. The method of claim 17, further comprising:
extending the plurality of optical fibers in a predetermined form to form one or more optical panels.

* * * * *